Aug. 25, 1964   P. FORTESCUE ETAL   3,146,173
FUEL ELEMENT
Filed March 7, 1960   3 Sheets-Sheet 1
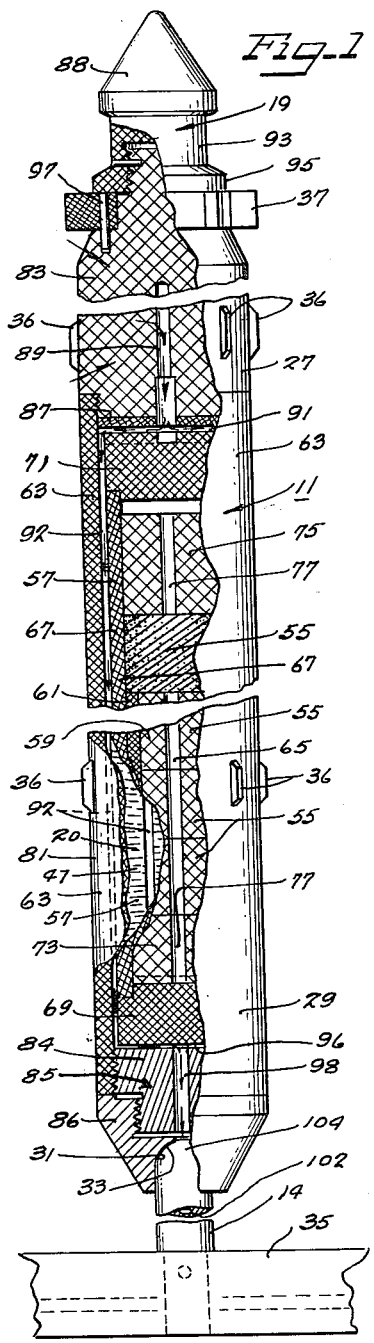
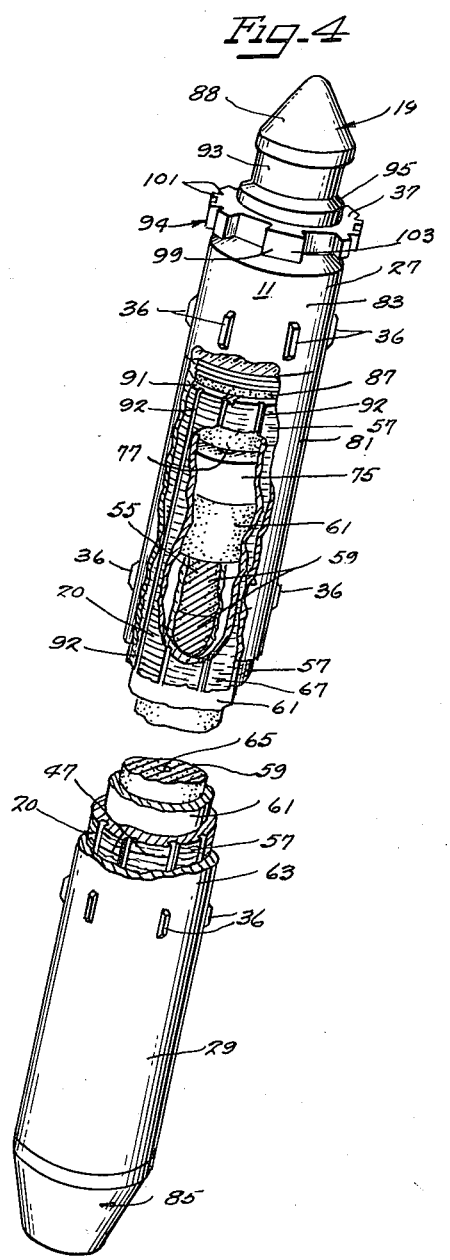
Inventors
PETER FORTESCUE
LLOYD R ZUMWALT
DAVID C. MORSE
By Roland A. Anderson
Atty

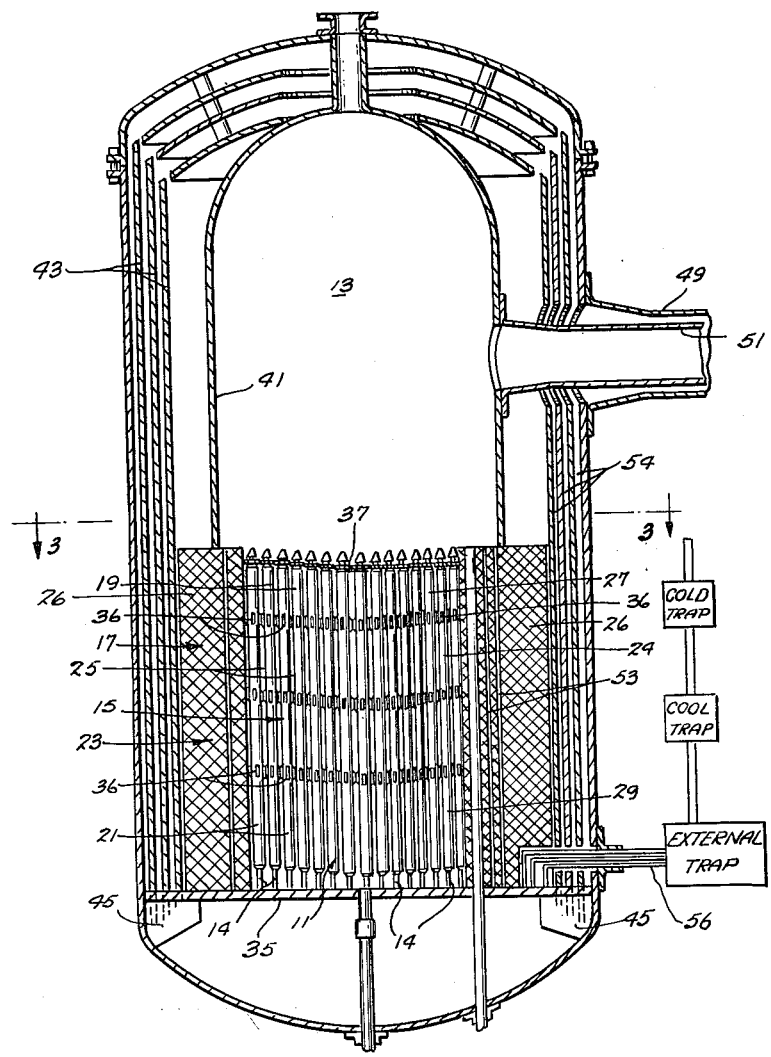

Aug. 25, 1964 P. FORTESCUE ETAL 3,146,173
FUEL ELEMENT
Filed March 7, 1960 3 Sheets-Sheet 3

Inventors
PETER FORTESCUE
LLOYD R ZUMWALT
DAVID C MORSE
By
Atty

United States Patent Office 3,146,173
Patented Aug. 25, 1964

3,146,173
FUEL ELEMENT
Peter Fortescue and Lloyd R. Zumwalt, San Diego, La Jolla, and David C. Morse, San Diego, Calif., assignors, by mesne assignments, to the United States of America as represented by the United States Atomic Energy Commission
Filed Mar. 7, 1960, Ser. No. 13,406
16 Claims. (Cl. 176—71)

The present invention generally relates to fuel elements for neutronic reactors and more particularly relates to fuel elements for high temperature, gas cooled neutronic reactors, which fuel elements include means for attenuating the migration of fission products therefrom.

In the generation of power by neutronic reactors operating by the well-known-fission process, economy is a prime consideration, as it is with other types of power generators. In this connection, it is, of course, important to obtain as high a degree of efficiency as possible in the transfer of heat from the reactor core fuel to the cooling medium. It is also of advantage to be able to provide a high power density so as to be able to generate a large amount of heat in a relatively small core under controlled conditions.

Gas cooled neutronic reactors offer the possibility of increasing the thermal efficiency of heat transfer from the reactor core since their coolants do not limit their temperature of operation, as is the case with liquid cooled systems. At higher operating temperatures of which gas cooled neutronic reactors are theoretically capable, the thermal efficiency in transferring heat from the reactor core to the coolant is considerably increased.

Various types of gas cooled neutronic reactors have been utilized heretofore for the generation of power and for other purposes. Examples of typical gas cooled neutronic reactors are as set forth in U.S. Patent No. 2,827,429 to Binner et al., U.S. Patent No. 2,831,807 to McGarry, U.S. Patent No. 2,799,642 to Hurwitz, Jr., et al., U.S. Patent No. 2,782,158 to Wheeler and U.S. Patent No. 2,714,577 to Fermi et al., as well as British Patent Nos. 779,134 (issued July 17, 1957) and 789,022 (issued January 15, 1958). An improved fuel element for a gas cooled neutronic reactor is set forth in co-pending U.S. patent of Fortescue and Zumwalt, 3,010,889, dated November 28, 1961, and entitled Fuel Element.

It is the principal object of the present invention to provide an improved element for gas cooled neutronic reactors. It is a further object of the present invention to provide an improved solid fuel element for high temperature, gas cooled neutronic reactors. Another object of the present invention is to provide a solid fuel element, a plurality of which elements are capable of operating efficiently in a neutronic reactor at high temperatures to provide high power density and a high degree of efficiency of heat transfer therefrom to a coolant. It is also an object of the present invention to provide a fuel element for a neutronic reactor, which element employs a novel and efficient system for the retention and attenuation of fission products generated in the fuel element during operation of the neutronic reactor. It is a further object of the present invention to provide an improved, economical, inexpensive fuel element for high temperature gas cooled neutronic reactors, a plurality of which elements can be utilized to form a reactor core capable of operating efficiently and economically for power generation.

It is a further object of the present invention to provide an improved fuel element for a high temperature, gas cooled neutronic reactor, in which fuel element there is a minimum migration of fission products to the primary coolant gas, thereby reducing fission product deposition within the primary coolant circuit components.

Further objects and advantages of the present invention will be apparent from a study of the following detailed description and of the accompanying drawings of which:

FIGURE 1 is a schematic fragmentary side elevation illustrating certain features of one embodiment of a fuel element in accordance with the present invention, portions being broken away to show the internal construction thereof;

FIGURE 2 is a schematic vertical section of a gas cooled neutronic reactor incorporating fuel elements embodying various of the features of the present invention, portions of the reactor being shown in elevation;

FIGURE 4 is a schematic perspective view of the fuel element of FIGURE 1, portions being broken away to show certain features of internal construction; and, FIGURE 5 is an enlarged view of a portion of the core shown in FIGURE 3 and illustrating the locking means for interconnecting adjoining fuel elements.

Figure 3:
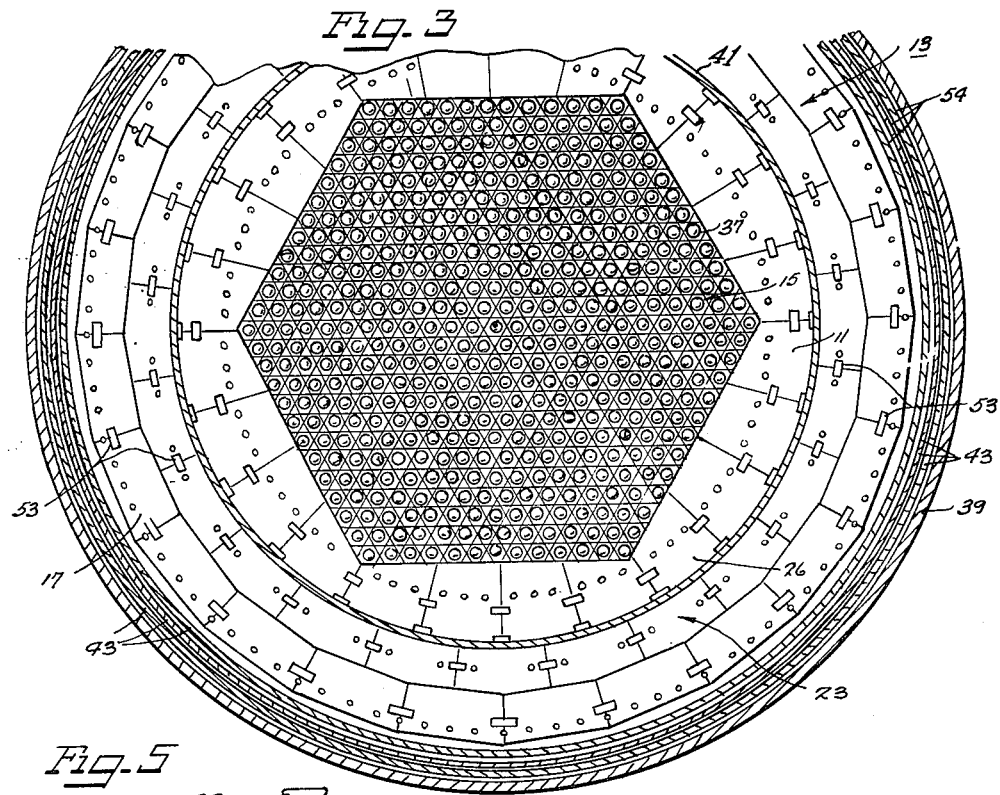
FIGURE 3 is a schematic sectional view of the reactor core, taken along the section line 3—3 of FIGURE 2.

It has been found that fuel elements can be provided in accordance with the present invention, which fuel elements are capable of functioning satisfactorily in a compact gas cooled neutronic reactor core over an extended period of time at high temperatures substantially in excess of 1800° F. to provide a reactor system with increased thermal efficiency, of up to about 40 percent and with increased power density. It should be understood that the fuel element of the present invention can be readily applied in conventional type gas cooled neutronic reactors.

The fuel element of the present invention utilizes one or more fuel compacts formed of a generally homogeneous mixture of a solid moderator, such as graphite, etc., and suitable fuel, such as uranium 235. The fuel may also include a fertile material such as thorium 232. With this arrangement, a substantial increase in the total surface area of each fuel element is provided while maintaining substantially the same core volume. This results in an improved thermal efficiency and permits operation of the reactor at increased power density.

The fuel element of the invention also does not require the usual metallic jacket and fines or other extended surfaces, as are found in solid heterogeneous type fuel elements, and is capable of operating at higher temperatures, substantially in excess of 1800° F., with improved neutron economy and thermal efficiency.

Elimination of the metallic jacket would present a problem of containment (retention and/or attenuation) of radioactive volatile fission products arising during the high temperature operations. This problem is overcome, at least to a substantial degree, through the use, in accordance with the present invention, of praphite or other thermal moderator as a jacket or can around the fuel, which moderator is so formed or pre-treated as to have a low permeability, i.e., to have a high degree of resistance to the passage of fission products therethrough.

The fuel element of the present invention includes an outer container and a single fuel can within the container, both of low permeability moderator, the fuel can containing end reflectors and a central portion formed of a plurality of fuel compacts. Each fuel compact comprises a mixture of fuel and moderator disposed around a central core of moderator.

In addition, the fuel element is provided with means for attenuating the passage of fission products therefrom. This attenuation is effected by a combination of features which are provided in the fuel element. These include: (a) double walled low peremeability containment of the fuel compacts within the fuel element; (b) purge channels between the container and fuel can and means for continuously scavenging these channels by gas which enters by way of a controlled in-leak. The fuel elements are connected in the reactor to permit the gas passing through the purge channels to carry the fission products to an external fission-product trapping system. There are also provided (c) means within the fuel can for minimizing the build up of fission product gas pressure in the fuel can.

Highly efficient trapping of volatile fission products is achieved by providing the fuel element with a gas porous upper section, so that coolant gas passes inwardly of the fuel element and through the purge channels to an external trap which may include adsorbing agents.

Such arrangement need not completely prevent any fission products whatever from passing from the fuel elements into the primary coolant system of the reactor. Instead, it is sufficient that the arrangement remove a large portion of the fission products from circulation and attenuate or slow down the passage of the remainder of the fission products to prevent a build-up of the fission products in the primary coolant circuit (within and outside of the core) to an extent which would make maintenance of the reactor difficult or prevent its use in a safe manner over an extended period of time.

The fuel element and fission product trapping system are preferably vented to a zone of lower pressure, i.e., a point in the primary coolant circuit where the pressure is at least slightly lower than that in the coolant passages between the fuel elements. This arrangement assures that transfer of coolant through the fuel element in inwardly from the higher pressure zone external of the fuel element in the core of the reactor. Coolant backflow from the fuel element to the primary coolant circuit is substantially avoided and, accordingly, volatile fission products do not leak out to the primary coolant.

A preferred point for such venting is one along the suction inlet to the gaseous coolant circulators of the primary coolant circuit.

Referring more particularly to FIGURE 1 of the accompanying drawings, a preferred embodiment of the fuel element of the present invention is illustrated. A plurality of such fuel elements 11 are also shown in FIGURE 2 uniformly spaced and generally vertically disposed in the conventional manner within a typical gas cooled neutronic reactor 13. The relative heights of the individual fuel elements as positioned within the core have been exaggerated to clearly illustrate variations in the length of supporting means or stems 14 for the fuel elements as hereinafter more fully described. The plurality of fuel elements 11 comprise the reactor core 15, which is generally in the form of a right cylinder and which is surrounded on all sides thereof by a reflector 17 of neutron moderating material, such as graphite, which may be largely constructed, as indicated in FIGURE 3 of the accompanying drawings, of a plurality of blocks. The reflector is comprised of a top reflector 19 immediately above the active portion of the fuel elements, a bottom reflector 21 immediately below the active portion of the fuel elements and a side reflector 23 around the periphery of the bundle or mass of fuel elements forming the core. The top and bottom reflectors form integral portions of the fuel elements. The side reflector may comprise, for example, a row of dummy fuel elements 24 formed of moderator and a concentric ring of moderator 26 enclosing the core.

The fuel elements are generally circular in cross-section and are uniformly spaced apart within the core in a geometrical pattern. Desirably, the spacing pattern for the fuel elements may be in the form of equilateral triangles, as shown in FIGURE 3.

In any event, the fuel elements are arranged so that spaces 25 are provided therebetween, as shown in FIGURE 2, to permit the ready passage therethrough of the gaseous coolant. The gaseous coolant is a stable, non-corrosive and non-reactive medium, such as helium or other inert gas. It will be understood that suitable control rods (not shown) are distributed throughout the reactor core in a suitable pattern.

The upper portion 27 of each of the fuel elements particularly illustrated in FIGURE 1, comprises a portion of the top reflector 19 of the reactor. The bottom portion 29 of each fuel element comprises a portion of the bottom reflector 21 of the reactor. The bottom of each fuel element has a cavity centrally disposed therein, such as cavity 31 illustrated in FIGURE 1. The cavity is adapted to receive at least the end or top portion 33 of a generally vertically extending fuel element support means 14 disposed on a horizontally extending grid plate 35. The stand-offs 14 aid in maintaining the bottom of the respective fuel elements in proper horizontal position within the reactor core.

Figure 5:
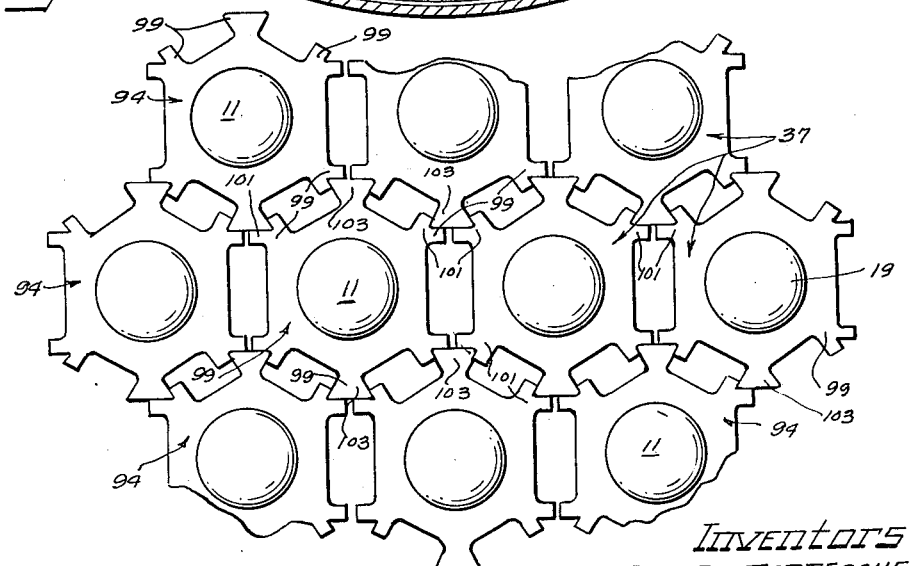

Moreover, as shown more particularly in FIGURES 1 and 2, the fuel elements may be provided with spacing means 36 disposed on the outer surface thereof, to aid in maintaining the fuel elements properly spaced laterally from one another and also to distribute the side loads for the fuel elements. Dovetail locking means 37, as illustrated particularly in FIGURE 5, are also preferably provided for precise positioning and spacing of the upper end of each fuel element in the core. Accordingly, the respective adjoining fuel elements touch each other preferably only at the locus of the spacer means and/or dovetail locking means.

The fuel element stand-off 14 may be disposed on the described horizontally extending grid plate 35, which is in turn connected to a generally vertically extending, closed, outer reactor shell or pressure vessel 39. A dome shaped plenum shroud 41 as illustrated in FIGURE 2 may, in turn, be disposed above the reactor core, with the lower end thereof supported on the upper surface of the side reflector. A plurality of thermal shields 43 are disposed around and spaced from the sides of the reflector and from one another. The lower ends of the thermal shields may terminate below the plate 35 on supporting abutments 45, as shown in FIGURE 2.

As shown in FIGURE 2, an inlet tube 49 and a concentric outlet tube 51 provide access to and from the reactor vessel for the cooling gas which circulates through a primary circuit between the reactor vessel 39, steam generators (not shown) and main circulators (not shown). Within the reactor vessel, the coolant circulates through the thermal shields, the side reflector, the reactor core and plenum shroud. Suitable passageways are provided within the side reflector and between the thermal shields for the passage of coolant gas, as illustrated at 53 and 54 respectively in FIGURES 2 and 3.

As illustrated in FIGURE 2, passageways 56 are provided for the passage of the purge gas and the scavenged gaseous fission products to appropriate fission product traps, more fully described hereinafter, located outside of the reactor vessel 39.

Now referring more particularly to FIGURE 1 of the accompanying drawings, the fuel element 11 is shown, with portions broken away to display its internal construction. The fuel element 11 comprises, in part, a plurality of fuel compacts or slugs 55, the compacts being of any suitable size and shape commensurate with the requirements of the fuel element and reactor core design. The plurality of fuel compacts are assembled in stacked relation with a fuel can 57 which is formed of neutron moderating material, preferably graphite, which has been formed or treated to provide a very low permeability to fission products.

Each fuel compact 55 is of suitable size and shape and comprises an outer region 61 of a mixture of fuel and moderator and a hollow central core 59 of moderator. Thus, for example, the fuel compacts illustrated in FIGURES 1 and 4 are in the form of hollow cylinders. The outer region 61 can therefore be an annular ring or other shaped self-supporting homogeneous mixture of fuel and moderator. Each fuel compact can be unitary, comprising moderator with the fuel dispersed in the moderator only in the outer region 61 of the cylinder so as to provide a hollow central core of unfueled moderator. Alternatively, it can be formed of two distinct components, an outer sleeve, ring, etc., of fuel dispersed in moderator matrix, and an inner hollow core of moderator, joined together. In any case, graphite is the preferred moderator for the region 61 and also the core 59.

When fertile material such as uranium-238 or thorium-232 is utilized, in the fuel along with uranium-235, additional fissionable material results through neutron capture by the fertile material. The fuel life is thereby extended.

The relative proportions of fuel constituents and the amounts of such constituents within each fuel element compact and within the core of each reactor will vary, depending upon the parameters of the reactor. Generally speaking, however, the uranium-235 is present in a much smaller amount than the fertile material. At any rate, the amount of the fuel constituents in the assembled fuel elements disposed within the reactor core should, of course, be sufficient considering the parameters of the reactor, to initiate and to sustain the desired fission chain reaction for the desired core life.

The following Table I sets forth a summary of characteristics of a specific 40 megawatt electrical power reactor of the gas-cooled, high temperature type employing the fuel element of the present invention.

TABLE I

*Technical Data for the High-Temperature Gas-Cooled Reactor*

Operating conditions:
| | |
|---|---|
| Coolant | Helium |
| Pressure, atm. | 20 |
| Inlet temperature, °F. | 660 |
| Outlet temperature, °F. | 1380 |
| Maximum fuel-surface temperature (approx.), °F. | 2300 |
| Steam temperature, °F. | 1000 |
| Steam pressure, p.s.i.a. | 1450 |
| Net thermal efficiency, percent | 34.8 |
| Reactor thermal output, mw. | 115 |
| Net electrical power, mw. | 40 |

Reactor parameters:
| | |
|---|---|
| Fissile investment ($U^{235}$), kg. | 190 |
| Thorium investment, metric tons | 1.19 |
| Core diameter, ft. | 9.0 |
| Core length, ft. | 7.5 |
| Core coolant voidage, percent | 12.8 |
| Fuel-element diameter, in. | 3.50 |
| Number of fuel elements (approx.) | 810 |
| Reflector thickness, ft. | 2 |
| Core graphite weight, metric tons | 19.5 |
| Reflector graphite weight, metric tons | 47.7 |
| Pressure-vessel diameter (inside), ft. | 14 |
| Pressure-vessel height, ft. | 34 |
| Core graphite/uranium ratio | 1900 |

Burn-up:
| | |
|---|---|
| Fissions per original fissile atom | 0.63 |
| Mw.-days (heat) per metric ton of $U^{235}+Th^{232}$ | 75,000 |
| Core life (at 80% load factor), yrs. | 3 |

From the foregoing, it is apparent that the initial amount of uranium-235 in relation to the initial amount of thorium-232 in the core may be relatively small, for example, approximately 18–20% by weight, and that the total amount of fuel required for sustained high temperature operation is also relatively small.

In a reactor core, such as that set forth in Table I, the fuel element may, for example, be generally cylindrical with an average length of about 144 inches, a diameter of about 3.50 inches, and an active fuel portion about 90 inches long. However, other sizes for the fuel elements, compacts and other components are also suitable.

The size of each fuel compact containing the fissionable and fertile mixture compacted with moderator is preferably kept small to facilitate fabrication, handling, etc., for example, about 2.25 inches in diameter and about 4.50 inches long, with a central core 1.50 inches in diameter. As an example, in the reactor core specified in Table I, each fuel element contains a total amount of approximately 1470 grams of thorium-232 and 235 grams of uranium-235; both the thorium and uranium may be present as carbides. Accordingly, if there are, for example, twenty fuel compacts containing uranium-235 and thorium-232 in a fuel element, there will be about 12 grams of uranium-235 and about 73 grams of thorium-232 present per fuel compact.

The amount of moderator present in each fuel element will, of course, also depend upon the parameters of the reactor. In the reactor described in Table I, the initial carbon to uranium-235 ratio may be about 1900:1 and the initial carbon to thorium ratio may be about 300:1. However, other moderator-to-fuel ratios could be employed, depending on the type of fuel utilized, etc. In the fuel slugs, the uranium-235 plus thorium-232 concentration is maintained preferably at not more than about 30 weight percent.

In the fuel compact 55, the thorium-232 and uranium-235 are preferably present as carbide. They are also preferably present in the form of particles of relatively large size, for example, 100 microns to 300 microns. Preferably, the average particle size is about 150 microns, so that about 150 microns of moderator is disposed between the fuel particles. This distribution reduces radiation damage to the moderator of the fuel compact by recoiling fission products. Substantially homogeneous mixing of the uranium-235 and the thorium-232 with moderator can be readily accomplished when the constituents are in discrete particulate form. Although graphite is preferred as the moderator in the fuel mixture, other suitable moderator material, for example, beryllium or beryllium oxide, may also be substantially uniformly mixed therewith.

Mixing of the moderator particles with those of the fuel may be carried out in any suitable manner until the mixture is substantially homogeneous. Thereafter, the resultant mixture is compacted and densified under suitable temperature and pressure conditions, according to conventional metal working or powder metallurgy techniques, to provide a cohesive stable fuel compact of any desired size and shape.

The object of the compacting and densifying steps is to provide a finished stable solid fuel compact with few voids, that is, as dense as readily accomplishable. This tends to reduce the rate of passage of fission products therefrom. Moreover, the finished fuel compact must be capable of withstanding temperatures of the order of 3000° F. over extended periods of time during operation of the reactor.

The central core 59 of moderator is preferably graphite and may be formed in any suitable manner. The central core, in accordance with the fuel element illustrated in FIGURE 1, is provided with a centrally disposed passageway 65 extending longitudinally therethrough. The passageway is sized so that the overall void percentage within the fuel can including the void space in the graphite is preferably about 25 percentage.

The described fuel mixture, i.e., fissile material (uranium-235) fertile material (thorium-232) and moderator (graphite) etc., may first be cold-pressed together to form a hollow cylinder with a hole corresponding to the central core. The cold pressing can be facilitated by utilizing a binder, such as pitch, petroleum, etc., in the mixture. The central core of moderator can be separately formed in a similar fashion. The cold-pressed hollow fuel cylinder and the hollow core can then be slipped together and resistance hot pressed under conventional techniques to provide the composite compact exhibiting the desired fine grain and strength, stability and uniformity. Alternatively, the central core can first be formed and the fuel mixture cold pressed around the core, then hot pressed to provide a finished unit.

Various other techniques can be utilized to provide the unitary compact 55.

From the foregoing, it will be understood that the fabricating conditions and techniques employed for the manufacture of the fuel compact are a matter of choice and will depend somewhat on the particular constituents selected for the fuel compact and their relative proportions in the compact. If desired, a procedure such as that specified in copending U.S. application Serial No. 784,064, now Patent No. 2,995,471, to Goeddel et al., filed December 31, 1958 and assigned to the assignee of the present invention, may be employed.

Hot pressing operations, followed by hot sintering operations, may be utilized. In addition, various impregnating and coating techniques may be utilized to further densify the fuel compacts after they are formed, thereby further retarding the diffusion of volatile fission products therefrom.

Thus, a fuel compact is provided in which the central hole of the core furnishes additional void space for fission products and the series of holes of the plurality of central cores, when aligned in stacked relation, as illustrated in FIGURE 1, in the fuel element, provide a central channel for volatile fission products from the fuel to migrate to the cooler lower region of the fuel can.

The fuel mixture is concentrated in an annular ring in order to lower the maximum fuel temperature from that in a homogeneous solid cylindrical fuel compact.

As previously indicated, the fuel compacts 55 are encased as shown in FIGURE 1 in a can 57 of neutron moderating material having a low permeability. The fuel can acts as a barrier against the diffusion of volatile fission products, the walls thereof substantially reducing the rate of passage of the volatile fission products outwardly therethrough.

Graphite is the preferred moderator material to be utilized for the fuel can 57 since it offers a preferred combination of high temperature physical, mechanical, thermal and nuclear properties. However, normal graphite, i.e., the usual commercial grades of graphite, are unsatisfactory per se for the purposes of the present invention, since they are, in their untreated form, relatively porous, readily permitting the passage therethrough of fission products.

Through the use of appropriate conventional densifying or pore filling steps, i.e., coating and/or impregnating, hot dipping, vapor-plating, spraying and firing, etc., a treated graphite can be prepared which has a low permeability to fission products even at temperatures in excess of 2000° F. over extended periods of time. Examples of graphite impermeabilizing techniques such as may be employed are specified in copending U.S. application, Serial No. 784,064, now Patent No. 3,031,389, to Goeddel et al., filed December 31, 1958, U.S. Serial No. 784,071, now Patent No. 3,001,238, to Goeddel et al., filed December 31, 1958, and U.S. Serial No. 784,074, now Patent No. 2,995,471, to Gurinsky, filed December 31, 1958. For the purposes of the present invention, it is preferred that the treated graphite fuel can have a permeation coefficient of from approximately $1 \times 10^{-6}$ cm.$^2$/sec. to approximately $1 \times 10^{-7}$ cm.$^2$/sec., or better, as measured for helium leakage at room temperature.

Coatings applied to graphite canning material to lower the permeability thereof should become integral with the base material in order to be durable in use. That is, the coatings should physically or chemically bond with the base material during or after application. It is preferred that the coating also permeates down through the graphite in a diffusion zone which may be several mils thick so as to minimize damage due to differential thermal expansion between the coating and graphite. Silicon carbide and zirconium carbides have excellent high temperature stability and sufficiently low thermal neutron capture cross sections so that they can be readily utilized for such coatings.

Obviously, the size and shape of the fuel can 57 will vary. In a typical fuel element of about 144 inch overall length, the fuel can may be, for example, 115 inches long. The wall thickness will also vary, depending upon the strength of the canning material, its permeability, etc. For example, graphite having the described low permeability and a density of about 1.85 gr./cc. will be suitable for use as canning material at temperatures upward of 2800 F., even if the wall of the can is only about 0.25 inch thick, as hereinafter described.

The fuel can 57 illustrated in FIGURE 1 includes an annular side wall 67 sealed to a bottom closure 69 and a top closure 71, as by zirconium brazing, or the like, to render the seal as impermeable to fission products as the closures and sidewall.

The bottom closure 69 is also made impermeable, by providing its upper surface with a suitable impermeable coating; or it may be formed of impermeable graphite. The bottom closure may be sealed to the lower end of the sidewall of the fuel can.

As illustrated in FIGURE 1, one or more blocks 73 comprising porous graphite or other moderator material, are disposed within the fuel can 57 to aid in furnishing void space for the can and as part of the bottom reflector 21 of the fuel element. Accordingly, in filling the can, blocks 73 are first disposed in the can. Then the fuel compacts are placed in stacked relation in the can. Thereupon, blocks 75 of graphite or other moderator material are inserted to substantially fill the fuel can 57. Such blocks 75 are part of the top reflector 19 of the fuel element. Blocks 73 and 75 are provided with longitudinally extending holes 77 centrally aligned with the holes 65 in the cores of the fuel slugs for conducting fission products to the lower portion of the fuel can. After the can is filled, as described, the top closure 71 of the can which is also made impermeable as by coating, etc., or is formed of impermeable graphite, etc., may then be sealed in place, as by zirconium brazing, etc.

The tolerances between fuel compacts and can sidewall are preferably fairly close so that there is no large gap therebetween. However, convective circulation between compacts and fuel can takes place, as hereinafter described.

The filled and sealed fuel can is then disposed within a closely fitting outer container 63, as illustrated in FIGURE 1, fabricated of moderator material having a low permeability to fission products. The container is preferably fabricated of graphite treated as previously described and comprises a sidewall or sleeve 81 threaded or otherwise joined at its upper end to a top reflector block 83 and at its bottom end to a support coupling 85, including an upper portion 84 and an end fitting 86, the latter fabricated of stainless steel. Sealing, as by zirconium welds, etc., may be employed to make the container tight.

The sleeve, upper portion 84 of the support coupling, and the lower end portion 87 of the top reflector block adjacent the top closure 71 of the fuel can are fabricated of low permeability moderator so that they form the container and effect with the fuel can double-walled low permeability containment of the fuel compacts. However, the top reflector block 83, except for the lower end 87 thereof, is fabricated of graphite porous to coolant gas. The low permeability lower end 87 of the block may be rendered so by coating, impregnating, etc., as previously described for the fuel can. The permeation coefficient for the outer container 63 is approximately that recommended for the fuel can. This permeation coefficient limits the leakage of fission products through the combined can and container to about 1 part per million of gaseous fission product formed within the fuel can.

It will be observed that with the fuel can filled and positioned in the container 63, as illustrated in FIGURE 1, the top reflector block 83, top closure 71 and block 75 comprise, with the fuel can and container 63 in that region, the top reflector 19 of the fuel element. Similarly, the bottom reflector comprises block 73, closure 69, the fuel can and container 63 in the lower portion of the fuel element and at least the major portion 84 of coupling 85.

The tight or interference fit between the container sleeve and fuel can enables these components to mutually carry the pressure load which builds up in the fuel can, even though the can wall thickness may only be 0.25 inch and that of the sleeve only about 0.375 inch. The pressure loads from fission product gases and coolant gas may be as much as 30 atmospheres.

Although the sleeve and fuel can fit tightly together, a plurality of channels 92 are provided between the sleeve and can, which channels extend the length of the fuel can. In this connection, the channels 92 may be formed by a plurality of semi-circular grooves or depressions in the outer surface of the fuel can, i.e., extending along the outer surface of sidewall 67 and adjoining surface of top and bottom closures 69 and 71. In a typical fuel element there are, for example, 28 of such grooves longitudinally spaced along the periphery of the fuel can, and approximately 1/16 inch in diameter.

It will be obvious that grooves, etc. in the inner surface of the sleeve 81 may be added to or substituted for the described grooves in the fuel can, for the same purposes. The channels 92 communicate with the porous block 83 and also with the cavity 31 in the support coupling, so that coolant gas enters the fuel element and passes downwardly therethrough, sweeping fission products therewith for removal through the stand-off.

It is generally further desirable that fission products passing through the fuel can be immediately conducted to the longitudinally aligned channels 92. In this regard, a network of relatively small grooves, scratches 20, etc., are usually present on the outer surface of the fuel can sidewall and inner surface of the sleeve, illustrated in FIGURE 4. These grooves, etc., extend between channels 92 and form channels 47.

The top reflector block may be fabricated of a solid block of graphite of the described type and is provided with a pointed head 88, the dovetail locking means 37 and a generally centrally disposed purge gas entrance passage 89 which extends through the lower end 87 and terminates in a space 91 between the block 83 and top fuel can closure 71, which space affords communication with the outer surface of the fuel can and channels 92. A plurality of channels 96 are provided adjacent the bottom of the fuel can, interconnecting the channels 92 with a passageway 98 centrally disposed within coupling 85 and longitudinally extending therethrough to cavity 31.

The purge gas entrance passage 89 is appropriately sized so as to substantially eliminate back diffusion of gaseous fission products. The reduction comes about because of the enhancement of molecular collisions of the gaseous fission products with incoming purge gas molecules.

The head 88 may be any desired shape to facilitate insertion and withdrawal of the fuel element to and from its position in the reactor core, as by remote control means (not shown). In this connection, a narrow neck 93 may be provided in the region of the head for easy engagement with a grappling means (not shown).

The dovetail locking means is illustrated in detail in FIGURE 5. In this regard, it comprises a generally annular graphite ring 94 which is disposed around the fuel element top reflector 19 in a region 95 of reduced diameter adjacent the head 88 and neck 93, and held in place by suitable means, as by pins 97, etc. The periphery of the ring 94 is cut away to provide six spokes 99 for positioning and receiving (dovetailing) similar spokes of six adjoining rings 94 of respective adjoining fuel elements, as illustrated in FIGURE 5. The spokes 99 comprise 2 pairs of forked spokes 101, positioned at respective sides of the ring, with a dovetail spoke 103 disposed between the pairs of spokes 101, each of said dovetailed spokes 103 being proportioned to fit the forked portions of two adjoining spokes 101, as illustrated in FIGURE 5. Accordingly, precise positioning of the respective fuel elements in the reactor core is afforded.

The sleeve 81 of the fuel element, as illustrated in FIGURE 1, is also provided on the outer surface thereof with a plurality of spacing means 36 or spacer pads of any suitable number, size and design, and of suitable material such as graphite, dimensioned with respect to the dovetail locking means 37 so that the side loads of the fuel elements in the core are borne by the pads and not the dovetail locking means, in view of the somewhat more delicate construction of the latter. When the respective fuel elements are spaced apart in the reactor core by the respective spacer means, spaces or interstices 104 therebetween are thereby provided for the circulaion of coolant therein.

The main portion 84 of the support coupling 85 is, as previously described, connected to the sleeve 81 at the lower end of the fuel element illustrated in FIGURE 1. It also is connected to bottom end fitting 86. Cavity 31 extends upwardly from the bottom of the coupling and is cup shaped and dimensioned to cooperate with spherical cap 104 of the stand-off 14 in supporting the fuel element 11. Passageway 98 is adapted to align with a passageway 102 in the stand-off for conducting fission products in coolant purge gas from the fuel element to one or more fission product traps external of the reactor vessel.

In a typical reactor, such as that illustrated in FIGURE 2, having the parameters set forth in Table I, and employing 810 fuel elements constructed substantially as set forth in FIGURE 1, total flow of helium gas through the primary coolant circuit may be about 480,000 lb./hr. From the primary circuit, about 200 lb./hr. of purge helium may be drawn into the 810 fuel elements for sweeping fission products out of the channels between the fuel can and sleeve, i.e., a flow rate of about 0.25 lb./hr. per fuel element. The helium is drawn into each fuel element through the porous upper reflector block 83 where it enters the central duct 89 therein. The porosity of the block controls the rate of flow of the purge gas. From the duct it passes to the space between top fuel closure and bottom of the block, then to channels 92 between the fuel can and sleeve, as previously described. Fission products which have passed out of the fuel can into the channels 92 are swept downwardly by the purge gas in channels 92 into channels 96 adjacent the base of the fuel can and flow radially inwardly therein to central passageway 98 communicating with the cavity 31 in the support coupling and with the channel 102 in the stand-off 14. The purge stream with fission products therein passes through the stand-off to the external fission product trapping system.

Fission gases which remain within the fuel can cause a gradual build-up of pressure until at the end of core life, approximately three years of operation, the pressure due to such build-up is about 10 atm. About half of the fission products are non-volatile or form stable carbides which remain in the fuel compacts. Some fission products, such as rubidium, strontium, tellurium, cesium and barium are volatile at the temperatures of the hotter regions of the core but migrate to the lower reflector where they condense. Even volatile iodine and bromine fission products will tend to condense due to their chemical combination with excess fission product cesium and rubidium to form CsI, CsBr, etc. However, the elements xenon and krypton are completely volatile at all temperatures and major contributors to the pressure build-up in the fuel can. Primary circuit helium tends to diffuse over a long period of time through the fuel can and reach an equilibrium pressure of 20 atm. in the fuel can. The total pressure in the fuel can after three years of operation thus will be about 30 atm.

As previously described, voids are present within the fuel can, affording volume for some accumulation of fission gases. In this connection, pore spaces are necessarily present within the graphite structures in the fuel can. Moreover, the holes 65 in the central graphite cores provide additional void space for the accumulation of fission products and also provide a path for a convective loop which can carry fission products to the lower cooler reflector region within the fuel can. In this regard, gases pass down the gap between the periphery of the stacked fuel compacts and the inner surface of the fuel can, then up through the central holes 65 to form the convective loop. Since the absolute temperature in the bottom reflector is about 1/3 the mean fuel temperature, the void volume in the bottom portion of the fuel can is about three times as effective in decreasing the fuel can pressure as the same volume in the active core region of the fuel element. With such an arrangement, and with the construction of the fuel can and sleeve within the previously indicated tolerances, so as to bear the gas pressure load as a unit, the fuel element is durable in use.

External fission product traps comprising conventional activated charcoal and/or cold traps are employed. It will be understood that, if desired, additional adsorptive traps may be disposed within the fuel element adjacent the lower end thereof and within or outside of the fuel can. Such traps should be protected against leakage of fission products therefrom by containment in moderator of low permeability.

All but the noble gas fission products are removed as the purge stream passes through the external fission product traps. The noble gas fission products are not adsorbed with comparable efficiency and are not fully adsorbed in a single pass through the traps. However, since they also will not be deposited in the primary circuit, they are reduced to a low equilibrium level by recycling through the traps.

Accordingly, an improved fuel element has been described which features a unique system for the retention and attenuation of fission products. The fuel element is capable of highly efficient and safe operation at elevated temperatures over extended periods of time without breakdown and without deleterious fission product build-up in the primary coolant circuit.

Since the fuel element utilizes enriched fuel, the reactor core can be kept relatively small. The core can be adequately cooled with highly satisfactory heat transfer when the gas coolant, preferably helium, is utilized at a modest pressure of about 20 atmospheres.

Since the fuel element of the present invention is capable of operating at high temperatures, for example, 2000° F. or more, heat transfer from the fuel element to the surrounding cooling gas is carried out in a highly improved manner.

A further advantage of operating at high temperatures with the fuel element of the present invention is that Wigner stored energy effect and growth problems in graphite can be avoided. Such problems are overcome since at the usual operating temperatures contemplated for the fuel elements of the present invention, the radiation effects of the fuel on the graphite are continually annealed. Other advantages of the present invention are as set forth in the foregoing.

It will be appreciated that such modifications in the components of the fuel element of the present invention, in their combination, and in their methods of fabrication as are within the skill of those versed in the art are contemplated as being within the scope of the present invention.

We claim:

1. A fuel element for a neutronic reactor, said fuel element comprising an outer container fabricated of neutron moderating material having a low permeability to fission products and containing a purge gas porous inlet region adjacent the upper end thereof and a purge gas outlet adjacent the bottom end thereof and adapted for connection with means conducting purge gas with fission products from a reactor core in which the fuel element is to be disposed, a closed fuel can fabricated of neutron moderating material having a low permeability to fission products disposed wholly within said container, the adjacent surfaces of said can and container being arranged to provide a plurality of purge gas channels between said can and container, said channels communicating with said upper porus region and with said gas outlet, and at least one fuel compact disposed within said closed can, each of said compacts having a central passageway extending therethrough, a convective pathway within said can being provided by said central passageways and space between each of said fuel compacts and can whereby fission products from said fuel compact pass to the lower portion of said fuel element within said can, said can and container providing double walled containment of each of said compacts.

2. A fuel element for a neutronic reactor, said fuel element comprising an outer container fabricated of neutron moderating material having a low permeability to fission products and containing a purge gas porous inlet region adjacent the upper end thereof and a purge gas outlet adjacent the bottom end thereof and adapted for connection with means conducting purge gas with fission products from a reactor core in which the fuel element is to be disposed, a closed fuel can fabricated of neutron moderating material having a low permeability to fission products disposed wholly within said outer container, the adjacent surfaces of said can and container being arranged to provide a plurality of purge gas channels between said can and container, said channels communicating with said upper porous region and with said gas outlet, at least one of said adjacent surfaces of said fuel can and outer container also having a plurality of circumferential grooves and providing passageways for interconnecting said channels, and at least one fuel compact disposed within said closed can, each of said compacts having a central passageway extending therethrough, a convective pathway within said can being provided by said central passageways and space between each of said fuel compacts and can, whereby fission products from said fuel compacts pass to the lower portion of said fuel element within said can, said can and container providing double walled containment of each of said compacts.

3. A fuel element for a neutronic reactor, said fuel element comprising an outer container fabricated of neutron moderating material having a low permeability to fission products and containing a purge gas porous region adjacent the upper end thereof and a purge gas outlet adjacent the bottom end thereof and adapted for connection with means conducting purge gas with fission products from a reactor core in which the fuel element is to be disposed, a closed fuel can fabricated of neutron moderating materal having a low permeability to fission products snugly engaging and wholly disposed within said outer container, at least one of the adjacent surfaces of said can and container having a plurality of spaced longitudinally extending grooves therein, whereby a plurality of purge gas channels are provided between said can and container, said channels communicating with said upper porous region and with said gas outlet, at least one of said adjacent surfaces of said fuel can and outer container also having a plurality of generally circumferential grooves providing passageways interconnecting said channels, and at least one fuel compact disposed within said closed can, each of said compacts having a central passageway extending therethrough, a convective pathway within said can being provided by said central passageways and space between said fuel compacts and can, whereby fission products passing from each of said fuel compacts pass to the lower portion of said fuel element within said can, said can and container providing double walled containment of each of said compacts.

4. A fuel element for a neutronic reactor, said fuel element comprising an outer container fabricated of graphite having a low permeability to fission products and containing a purge gas porous inlet region adjacent the upper end thereof and a purge gas outlet adjacent the bottom end thereof and adapted for connection with means conducting purge gas with fission products from a reactor core in which the fuel element is to be disposed, a closed fuel can fabricated of graphite having a low permeability to fission products snugly engaging and wholly disposed within said outer container, at least one of the adjacent surfaces of said can and container having a plurality of spaced longitudinally extending grooves therein, whereby a plurality of purge gas channels are provided between said can and container, said channels communicating with said upper porous region and with said gas outlet, at least one of said adjacent surfaces of said fuel can and outer container also having a plurality of generally circumferential grooves providing passageways interconnecting said channels, and at least one fuel compact disposed within said closed can, each of said compacts having a central passageway extending therethrough, a convective pathway within said can being provided by said central passageways and space between said fuel compacts and can, whereby fission products passing from each of said fuel compacts pass to the lower portion of said fuel element within said can, said can and container providing double walled containment of each of said compacts.

5. A fuel element for a neutronic reactor, said fuel element comprising an outer container fabricated of graphite having a low permeability to fission products and containing a purge gas porous inlet region adjacent the upper end thereof and a purge gas outlet adjacent the bottom end thereof and adapted for connection with means conducting purge gas with fission products from a reactor core in which the fuel element is to be disposed, said gas porous region including a centrally disposed purge gas entrance passageway, suitably dimensioned to reduce back diffusion of purge gas entering said fuel element, a closed fuel can fabricated of graphite having a low permeability to fission products snugly engaging and wholly within said outer container, at least one of the adjacent surfaces of said can and container having a plurality of spaced longitudinally extending grooves therein, whereby a plurality of purge gas channels are provided between said can and container, said channels communicating with said purge entrance passageway of said upper porous region and with said gas outlet, at least one of said adjacent surfaces of said fuel can and outer container also having a plurality of circumferential grooves providing passageways for interconnecting said channels, and at least one fuel compact disposed within said closed can, each of said compacts having a central passageway extending therethrough, a convective pathway within said can being provided by said central passageways and space between each of said fuel compacts and can, whereby fission products from each of said fuel compacts pass to the lower portion of said fuel element within said can, said can and container providing double walled containment of each of said compacts.

6. A fuel element for a neutronic reactor, said fuel element comprising an outer container fabricated of graphite having a low permeability to fission products and containing a purge gas porous inlet region adjacent the upper end thereof and a purge gas outlet adjacent the bottom end thereof and adapted for connection with means conducting purge gas with fission products from a reactor core in which the fuel element is to be disposed, a closed fuel can fabricated of graphite having a low permeability to fission products snugly engaging and wholly disposed within said outer container, at least one of the adjacent surfaces of said can and container having a plurality of spaced longitudinally extending grooves therein, whereby a plurality of purge gas channels are provided between said can and container, said channels communicating with said upper porous region and with said gas outlet, at least one of said adjacent surfaces of said fuel can and outer container having a plurality of circumferential grooves and providing passageways interconnecting said channels, and a plurality of fuel compacts disposed in stacked relation within said closed can, each of said compacts having a central passageway extending longitudinally therethrough, the central passageways of said plurality of stacked compacts being aligned to form a portion of a convective pathway within said can, space between said fuel compacts and can forming the remainder of said pathways, whereby fission products from said fuel compacts pass to the lower portion of said can, said can and container providing double walled containment of said compacts.

7. A fuel element for a neutronic reactor, said fuel element comprising an outer container fabricated of graphite having a low permeability to fission products and containing a purge gas porous inlet region adjacent the upper end thereof and a purge gas outlet adjacent the bottom end thereof and adapted for connection with means conducting purge gas with fission products from a reactor core in which the fuel element is to be disposed, a closed fuel can fabricated of graphite having a low permeability to fission products disposed wholly within said outer container, in a manner to provide purge gas space between adjacent surfaces of said can and container, said purge gas space communicating with said upper gas porous region and said gas outlet, and at least one fuel compact disposed within said closed can, each of said compacts having a central passageway extending therethrough, whereby a convective pathway in said can is provided, including said central passageways and space between said compacts and can, each of said fuel compacts comprising a mixture of fuel material fissionable by neutrons of thermal energy and graphite disposed around a central core of graphite containing said central passageway, said can and outer container providing double walled containment of each of said compacts.

8. A fuel element for a neutronic reactor, said fuel element comprising an outer container fabricated of graphite having a low permeability to fission products and containing a purge gas porous inlet region adjacent the upper end thereof and a purge gas outlet adjacent the bottom end thereof and adapted for connection with means conducting purge gas with fission products from a reactor core in which the fuel element is to be disposed, a closed fuel can fabricated of graphite having a low permeability to fission products disposed wholly within said outer container in a manner to provide a purge gas space between adjacent surfaces of said can and container, said purge space communicating with said upper gas porous region and said gas outlet, and a plurality of fuel compacts disposed within said closed can, each of said fuel compacts comprising a particulate mixture of uranium 235 carbide, thorium 232 carbide and graphite disposed annularly around a central core of graphite containing a central passageway, a convective pathway within said can being provided by said central passageways and space between each of said fuel compacts and said can, whereby fission products from said compacts pass to the lower portion of said fuel element within said can, said can and outer container providing double walled containment of each of said compacts.

9. A fuel element for a neutronic reactor, said fuel element comprising an outer container fabricated of graphite having a low permeability to fission products and containing a purge gas porous inlet region adjacent the upper end thereof and a purge gas outlet adjacent the bottom end thereof, said outlet being adapted for connection with means for removal of purge gas from a reactor core in which the fuel element is to be disposed, a closed fuel can fabricated of graphite having a low permeability to fission products disposed wholly within said outer container in a manner to provide a purge gas space between adjacent surfaces of said can and container, said purge space communicating with said upper gas porous region and said gas outlet, and a plurality of fuel compacts disposed within said closed can, each of said fuel compacts comprising a particulate mixture of uranium 235 carbide, uranium 238 carbide and graphite disposed annularly around a central core of graphite containing a central passageway, a convective pathway within said can being provided by said central passageways and spaced between each of said fuel compacts and said can, whereby fission products from said compacts pass to the lower portion of said can, said can and outer container providing double walled containment of each of said compacts.

10. A fuel element for a neutronic reactor, said fuel element comprising an outer container fabricated of neutron moderating material having a low permeability to fission products and containing a purge gas inlet adjacent the upper end thereof and a purge gas outlet adjacent the bottom end thereof and adapted for connection with means conducting purge gas with fission products from a reactor core in which the fuel element is to be disposed, a fuel element locking means disposed along the periphery of said outer container adjacent the upper end thereof and dimensioned to interlock with corresponding locking means on adjacent fuel elements within a reactor core, spacer pads disposed along the periphery of said outer container at at least one level and dimensioned with respect to said locking means so as to bear side loads applied to said fuel elements instead of said locking means, a closed fuel can fabricated of neutron moderating material having a low permeability to fission products disposed wholly within said outer container in a manner to provide a purge gas space between adjacent surfaces of said can and container, said purge space communicating with said gas inlet and said gas outlet, and at least one fuel compact disposed within said closed can, said compact having a central pasageway extending therethrough, said can and said outer container providing double walled containment of each of said compacts within low permeability moderating material, fission products passing out of said can from said compacts being swept through said space and gas outlet by gas entering said fuel element through said inlet.

11. A fuel element for a neutronic reactor, said fuel element comprising an outer container fabricated of graphite having a low permeability to fission products and containing a purge gas porous inlet region adjacent the upper end thereof and a purge gas outlet adjacent the bottom end thereof and adapted for connection with means conducting purge gas with fission products from a reactor core in which the fuel element is to be disposed, said gas porous region including a centrally disposed purge entrance passageway, dovetail locking means disposed along the periphery of said outer container adjacent the upper end thereof and adapted to interconnect identical locking means on adjacent fuel elements, a plurality of spacer pads extending along the periphery of said outer container at at least one level and dimensioned to extend laterally beyond said dovetail locking means, a closed fuel can fabricated of low neutron permeability moderating material disposed wholly within said outer container in a manner to provide a purge gas space between adjacent surfaces of the can and outer container, said space communicating with said inlet region and said outlet, and a plurality of fuel compacts disposed in stacked relation within said closed can, each of said fuel compacts comprising a particulate mixture of uranium 235 carbide, thorium 232 carbide and graphite disposed in an annular ring around a central core of graphite containing a central passageway extending longitudinally therethrough, the central pasageways of the respective compacts being aligned to form a portion of a convective pathway within said can, the remainder of said pathway being provided by space between said plurality of fuel compacts and said can, whereby fission products from said compacts pass to the lower portion of said can, said can and outer container providing double walled containment of said compacts.

12. A fuel element for a neutronic reactor, said fuel element comprising an elongated container fabricated of neutron moderating material having a low permeability to fission products, said container having a purge gas porous inlet region adjacent the upper end thereof and a purge gas outlet adjacent the lower end thereof, a sleeve fabricated of neutron moderating material having a low permeability to fission products, said sleeve disposed within said container in a manner to provide a purge gas space between adjacent surfaces of said sleeve and container, at least one fuel compact disposed within said sleeve, said porous inlet region including a purge gas entrance passageway extending through said container and communicating with said purge gas space, said entrance passageway being dimensioned to inhibit back diffusion of fission products from said container.

13. A fuel element for a neutron reactor, said fuel element comprising an elongated container fabricated of graphite having a low permeability to fission products, said container having a purge gas porous inlet region adjacent the upper end thereof and a purge gas outlet adjacent the lower end thereof, a sleeve fabricated of graphite having a low permeability to fission products, said sleeve disposed within said container in a manner to provide a purge gas space between adjacent surfaces of said sleeve and container, at least one fuel compact disposed within said sleeve, said porous inlet region including a purge entrance passageway extending through said container and communicating with said purge space, said passageway being dimensioned to inhibit back diffusion of fission products from said container.

14. A fuel element for a neutronic reactor, said fuel element comprising an elongated container having a low permeability to fission products, at least one fuel compact, each of said compacts comprising a mixture of fuel fissionable by neutrons of thermal energy and neutron moderating material disposed around a central core of neutron moderating material, said core having a central passageway extending therethrough, said container including a purge gas porous inlet region at the upper end thereof and a purge gas outlet at the lower end thereof, a sleeve fabricated of neutron moderating material having a low permeability to fission products, said sleeve disposed within said container in a manner to provide a purge gas space between adjacent surfaces of said sleeve and container, said porous inlet region including a purge entrance passageway extending through said container and communicating with said purge space, said passageway being dimensioned to inhibit back diffusion of fission products from said container.

15. A fuel element for a neutronic reactor, said fuel element comprising an elongated container having a low permeability to fission products, at least one fuel compact, each of said compacts comprising a mixture of fuel fissionable by neutrons of thermal energy and graphite disposed around a central core of graphite, said core having a central passageway extending therethrough, said container including a purge gas porous inlet region at the upper end thereof and a purge gas outlet at the lower end thereof, a sleeve fabricated of graphite having a low permeability to fission products, said sleeve disposed within said container in a manner to provide a purge gas space between adjacent surfaces of said sleeve and container, said porous inlet region including a purge entrance passageway extending through said container and communicating with said purge space, said passageway being dimensioned to inhibit back diffusion of fission products from said container.

16. A fuel element for a neutronic reactor, said fuel element comprising an elongated container having a low permeability to fission products, at least one fuel compact, each of said compacts comprising a mixture of uranium 235 carbide, thorium 232 carbide and graphite disposed around a central core of graphite, said core having a central passageway extending therethrough, said container including a purge gas porous inlet region at the upper end thereof and a purge gas outlet at the lower end thereof, a sleeve fabricated of graphite having a low permeability to fission products, said sleeve disposed within said container in a manner to provide a purge gas space between adjacent surfaces of said sleeve and container, said porous inlet region including a purge entrance passageway extending through said container and communicating with said purge space, said passageway being dimensioned to substantially inhibit back diffusion of fission products from said container, and a plurality of spacer pads spaced along the outer surface of said container generally in the form of a ring.

References Cited in the file of this patent

UNITED STATES PATENTS

| | | |
|---|---|---|
| 2,780,596 | Anderson | Feb. 5, 1957 |
| 2,782,158 | Wheeler | Feb. 19, 1957 |
| 2,799,642 | Hurwitz et al. | July 16, 1957 |
| 2,871,176 | Draley et al. | Jan. 27, 1959 |
| 2,902,422 | Hutter | Sept. 1, 1959 |
| 3,010,889 | Fortescue et al. | Nov. 28, 1961 |

FOREIGN PATENTS

| | | |
|---|---|---|
| 1,174,121 | France | Nov. 3, 1958 |
| 1,187,405 | France | Mar. 2, 1959 |

OTHER REFERENCES

Nucleonics, March 1956, pp. 34–44.